(12) United States Patent
Hällgren et al.

(10) Patent No.: US 7,875,098 B2
(45) Date of Patent: Jan. 25, 2011

(54) CENTRIFUGAL SEPARATOR FOR CLEANING OF GAS

(75) Inventors: Ingvar Hällgren, Tumba (SE); Thomas Eliasson, Älvsjö (SE); Leif Larsson, Tumba (SE)

(73) Assignee: Alfa Laval Corporate AB, Lund (SE)

( * ) Notice: Subject to any disclaimer, the term of this patent is extended or adjusted under 35 U.S.C. 154(b) by 467 days.

(21) Appl. No.: 11/916,194

(22) PCT Filed: May 31, 2006

(86) PCT No.: PCT/SE2006/000645

§ 371 (c)(1),
(2), (4) Date: Jan. 31, 2008

(87) PCT Pub. No.: WO2006/132577

PCT Pub. Date: Dec. 14, 2006

(65) Prior Publication Data

US 2009/0025562 A1    Jan. 29, 2009

(51) Int. Cl.
*B01D 45/14* (2006.01)
(52) U.S. Cl. .................. 95/1; 55/406; 55/DIG. 19; 95/270; 96/397; 96/423
(58) Field of Classification Search .......... 55/406, 55/DIG. 19; 96/216, 397, 423; 494/9, 10; 95/1, 269, 270
See application file for complete search history.

(56) References Cited

U.S. PATENT DOCUMENTS

| | | | | |
|---|---|---|---|---|
| 1,558,382 A | * | 10/1925 | Alfred Marx | 204/545 |
| 3,986,663 A | * | 10/1976 | Jonsson et al. | 494/3 |
| 4,221,323 A | * | 9/1980 | Courtot | 494/10 |
| 4,601,696 A | * | 7/1986 | Kamm | 494/10 |
| 4,700,117 A | | 10/1987 | Giebeler et al. | |
| 5,382,218 A | * | 1/1995 | Uchida | 494/10 |
| 5,683,341 A | * | 11/1997 | Giebeler | 494/16 |
| 5,714,858 A | * | 2/1998 | Pieralisi | 318/539 |
| 6,368,265 B1 | * | 4/2002 | Barkus et al. | 494/8 |
| 6,491,615 B1 | * | 12/2002 | Campbell et al. | 494/10 |
| 6,572,523 B2 | * | 6/2003 | Herman et al. | 494/10 |
| 6,616,588 B2 | * | 9/2003 | Takahashi et al. | 494/10 |

(Continued)

FOREIGN PATENT DOCUMENTS

EP    494421 A    7/1992

(Continued)

*Primary Examiner*—Duane Smith
*Assistant Examiner*—Sonji Turner
(74) *Attorney, Agent, or Firm*—Michauf-Kinney Group LLP

(57) ABSTRACT

The invention refers to a centrifugal separator comprising a stationary casing defining an inner space, a spindle and a rotating member, which is attached to the spindle and arranged to rotate around an axis of rotation with a rotary speed. The rotating member comprises a number of separating discs which are provided in the inner space. A drive member drives the spindle and the rotating member with said rotary speed. A sensor device senses the rotation of the rotating member in relation to the casing. The sensor device comprises at least one transmitter element which is provided in the inner space on the rotating member and a receiver element which is provided at the casing and arranged to sense the transmitter element. The receiver element is provided on the casing outside the inner space.

13 Claims, 1 Drawing Sheet

U.S. PATENT DOCUMENTS

| | | | |
|---|---|---|---|
| 6,635,007 B2 * | 10/2003 | Evans et al. | 494/7 |
| 6,663,553 B2 * | 12/2003 | Campbell et al. | 494/10 |
| 6,764,437 B2 * | 7/2004 | Tetsu et al. | 494/10 |
| 6,783,571 B2 * | 8/2004 | Ekeroth | 95/8 |
| 7,396,373 B2 * | 7/2008 | Lagerstedt et al. | 55/406 |
| 2002/0111714 A1 | 8/2002 | Guthrie et al. | |
| 2003/0036470 A1 * | 2/2003 | Campbell et al. | 494/10 |
| 2003/0078152 A1 | 4/2003 | Fischer et al. | |
| 2004/0023782 A1 | 2/2004 | Herman et al. | |

FOREIGN PATENT DOCUMENTS

| | | |
|---|---|---|
| EP | 0560391 A2 | 9/1993 |
| EP | 1247584 A2 | 10/2002 |

* cited by examiner

CENTRIFUGAL SEPARATOR FOR CLEANING OF GAS

FIELD OF THE INVENTION

The present invention refers to a centrifugal separator comprising a stationary casing defining an inner space, a spindle, a rotating member, which is attached to the spindle and arranged to rotate around an axis of rotation with a rotary speed, wherein the rotating member comprises a number of separating discs which are provided in the inner space, a drive member for driving the spindle and the rotating member with said rotary speed, a sensor device for sensing the rotation of the rotating member in relation to the casing, wherein the sensor device comprises at least one transmitter element, which is provided in the inner space on the rotating member, and a receiver element, which is provided at the casing and arranged to sense the transmitter element.

BACKGROUND OF THE INVENTION

This invention refers in particular to a centrifugal separator intended for cleaning of crankcase gases from a combustion engine, especially for the driving of vehicles. Such centrifugal separators typically comprise a stationary casing and a rotor provided in the casing, which rotor comprises a spindle and a number of conical separating discs. The rotor in this kind of centrifugal separator is not normally enclosed in any casing but the oil separated from the crankcase gases is thrown outwardly against the inner wall of the stationary casing and may then flow along the wall down to a collection groove and an outlet. The rotor may be driven by various kinds of drive members. One variant is to drive the rotor by means of a blade wheel which is rotated by an oil jet from the oil system of the combustion engine. The pressure in the oil system will then determine the rotary speed of the rotor. However, such a drive of the rotor gives no indication of the rotary speed of the rotor. In order to enable any kind of control of the rotary speed, some types of sensor is required which can provide a value corresponding to the number of revolutions of the rotor. One proposed kind of sensor may include optical marking on the rotor, for instance using a bar code, and an optical reading device for reading and providing a value of the number of revolutions. Such a rotary speed sensor has, however, the disadvantage that the reading device has to include at least some part projecting in through the casing. It is then difficult to ensure high reliability regarding operation and the read number of revolutions. Furthermore, it is desirable that no such passages be made through the casing since they give rise to leakage.

EP-A-1 247 584 discloses a centrifugal separator having a stationary casing and a centrifuge rotor comprising a rotating casing and conical discs provided inside the casing. EP-A-1 247 585 discloses various different designs of sensors for sensing the rotation of the centrifuge rotor. A first variant comprises one single permanent magnet, which is fixedly attached to the centrifuge rotor and a sensor provided in connection to the stationary casing of the centrifugal separator. The sensor comprises a winding and a LED which flashes each time the permanent magnet passes the sensor. This document thus does not refer to any sensor of the number of revolutions in the sense that an exact number of revolution is disclosed, but rather an indication is given that the rotor rotates. The sensor is provided in such a way that it extends into the inner space inside the stationary casing.

U.S. Pat. No. 4,700,117 discloses a device for manipulating a high speed centrifuge. This centrifuge is a so-called laboratory centrifuge. The device aims at controlling the operation of the centrifuge and providing protection against a too high speed and to detect imbalances. The device includes magnets provided on the rotor and a stationary sensor operating with the Hall effect.

EP-A-494 421 also refers to a so-called laboratory centrifuge. Also this centrifuge has magnets on the rotor and a stationary sensor operating with the Hall effect.

SUMMARY OF THE INVENTION

The object of the invention is to provide a centrifugal separator having a reliable and secure determination of the number of revolutions.

This object is achieved by the centrifugal separator initially defined, which is characterized in that the receiver element is provided on the casing outside the inner space.

By such a receiver element, the transmitter element, which is attached to the rotating member, may be sensed each time it passes the receiver element, i.e. one time per revolution of the rotating member. Since the receiver element is provided on the casing outside the inner space, no receiving element parts are required, which project into the inner space and disturb the flowing and the separation to take place in the centrifugal separator. The receiver element may also in an easy manner be mounted on the centrifugal separator and dismounted for maintenance and/or replacement.

According to a preferred embodiment of the invention, the transmitter element is arranged to rotate along a circular path when the rotating member rotates, wherein the receiver element is provided in the proximity of a point on the circular path. The transmitter element may for instance be provided on one of the separating discs at a determined radial distance from the axis of rotation, wherein the receiver element is located relatively close to said point on the circular path. In such a way an unambiguous and secure reading of the transmitter element is ensured each time this element passes the receiver element.

According to a further embodiment of the invention, the transmitter element comprises a permanent magnet, wherein the receiver element is arranged to sense a magnetic field from the transmitter element each time the rotating transmitter element passes said point. Such a magnetic field may be sensed at a relatively large distance and through the casing.

According to a further embodiment of the invention, the sensor device comprises a processor unit, which is arranged to determine the rotary speed of the rotating member as a function of the passages of the transmitter element through said point and of the time. The processor unit may then be connected to the receiver element and arranged to count the number of sensed passages of the transmitter element through said point.

According to a further embodiment of the invention, the receiver element is attached to the outside of the casing. In such a way the casing may be left intact, i.e. no through-going holes have to be made through the casing.

According to a further embodiment of the invention, the drive member comprises a blade wheel which is rotable by means of a fluid jet. By means of the sensor device, the rotary speed of the rotating member may then be determined and read.

According to a further embodiment of the invention, the sensor device comprises two transmitter elements which are provided at two diametrically opposite positions on the rotating member. In such a way, the transmitter element will contribute to a proper balancing of the rotating member. As an alternative, the sensor device may however comprise one transmitter element and one weight element, which two elements then advantageously are provided at two diametrically opposite positions on the rotating member.

According to a further embodiment of the invention, said transmitter element, i.e. one or several transmitter elements, is embedded in one of said separating discs. In such a way, it may be avoided that the transmitter element or the transmitter elements projects out from the rotating member into the inner space and disturbs the flowing in the centrifugal separator.

According to a further embodiment of the invention, the receiver element operates according to the so-called Hall effect. Such a receiver element gives a reliable reading of the passages of the transmitter element through said point.

According to a further embodiment of the invention, the centrifugal separator is adapted for cleaning a gas by separation of liquid contaminants from the gas, wherein the centrifugal separator comprises an inlet for the gas to be cleaned, a gas outlet for the cleaned gas and an outlet for the separated liquid contaminants. Furthermore, the inner space, may have an upper end and a lower end, wherein the receiver element is provided in the proximity of one of the upper end and the lower end, and the outlet for the liquid contaminants is provided at the other of the upper end and lower end. Advantageously, the centrifugal separator may be adapted for cleaning of crankcase gases from a combustion engine.

BRIEF DESCRIPTION OF THE DRAWINGS

The present invention is now to be explained more closely by means of a description of various embodiments and with reference to the drawing attached hereto.

DETAILED DESCRIPTION OF VARIOUS EMBODIMENTS OF THE INVENTION

Figure 1:
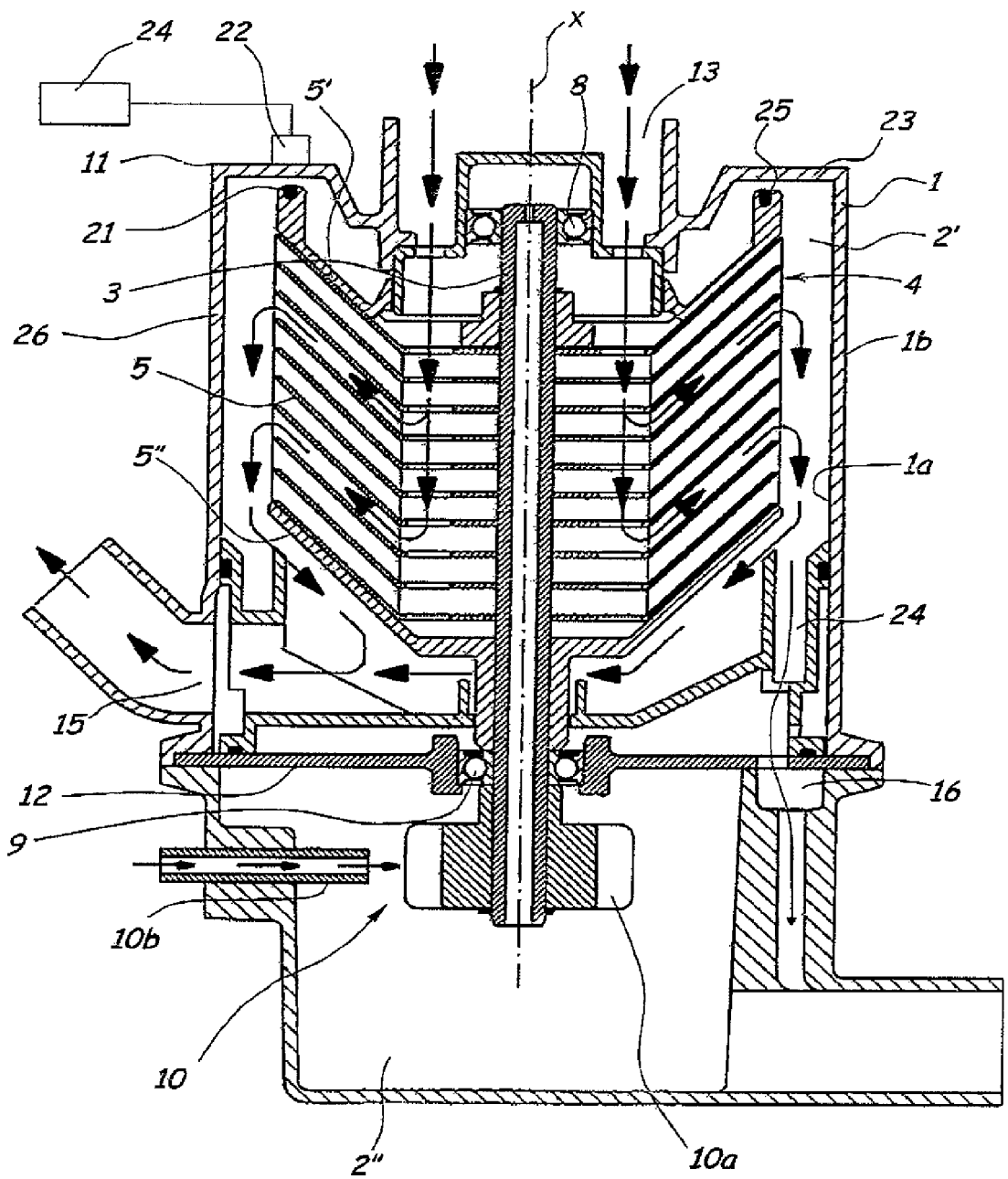
FIG. 1 discloses a cross sectional view of a centrifugal separator according to the present invention.

FIG. 1 discloses a centrifugal separator according to an embodiment of the invention. The centrifugal separator disclosed is intended for cleaning of gas and in particular crankcase gases from internal combustion engines. The combustion engines may be such for driving of motor vehicles or stationary combustion engines, for instance for generating electric energy. The centrifugal separator is also applicable to cleaning of other gases, such as air in and around machine tools in the engineering industry. The application areas mentioned comprise cleaning of gases containing contaminants, in particular liquid contaminants in the form of oil mist or oil droplets. The centrifugal separator according to the present invention is especially suitable for separation of such oil from the air or the gas.

The centrifugal separator disclosed comprises a stationary casing 1, which defines an inner space 2'. The stationary casing 1 has an inner wall surface 1a, which faces the inner space 2' and an outer wall surface 1b which faces outwardly towards the environment. The centrifugal separator also comprises a spindle 3 and a rotating member 4, which is attached to the spindle 3 and arranged to rotate around an axis x of rotation at a rotary speed. The rotating member 4 comprises a large number of separating discs 5,5',5" which each is attached to the rotating spindle 3 and which thus rotates in the inner space 2'. The spindle 3 is in the embodiment disclosed journalled in two bearings, one upper spindle bearing 8 and a lower spindle bearing 9. In the case that the centrifugal separator is adapted for cleaning of crankcase gases, it may advantageously comprise means for attachment to the combustion engine and connections for receiving crankcase gases from the crankcase of the combustion engine and for discharging clean gases to an environment or possibly for returning clean crankcase gases to the crankcase of the combustion engine.

Furthermore, the spindle 3 is connected to a suitable drive member 10, which in the embodiment disclosed is provided in a separate space 2" below the inner space 2'. The drive member 10 may be of various kinds. For instance, the drive member 10 may comprise an electric drive motor, a pneumatic drive motor or a hydraulic drive motor. The drive member 10 may also comprise a blade wheel 10a arranged to be driven by a jet of a liquid from any kind of nozzle 10b. In particular in the case with cleaning of crankcase gases from a combustion engine, the drive member 10 may comprise such a blade wheel 10a which is driven by oil from the combustion system of the combustion engine. This oil has a relatively high pressure, which via the nozzle 10b drives the drive member 10 at a suitable rotary speed. This rotary speed is, however, not exactly determinable but may vary at various states of operation for the combustion engine.

The inner space 2' has an upper end 11 and a lower end 12. The centrifugal separator also comprises an inlet 13 for the gas to be cleaned. In the embodiment disclosed, the inlet 13 extends through the casing 1 at the upper end 11 into the inner space 2'. Furthermore, the centrifugal separator has a gas outlet 15 for the cleaned gas and an outlet 16 for the separated liquid contaminants. In the embodiment disclosed, the gas outlet 15 and the outlet 16 for the liquid contaminants are provided in the proximity of the lower end 12.

The gas to be cleaned is thus fed in through the inlet 13 and in between the separating discs 5, 5',5". When the gas arrives in the inner space 2' and is brought to rotate by the rotating member 4, the liquid contaminants will be attached to the separating discs 5, 5',5" and by means of the centrifugal force thrown against the inner wall surface 1a of the casing 1. The gas, which in such a way has been cleaned and thus been substantially completely relieved from the liquid contaminants, is then conveyed downwardly in the inner space 2' and out through the gas outlet 15. The liquid contaminants flows on the inner wall surface 1a down into an annular collection groove 17 and out through the outlet 16.

Furthermore, the centrifugal separator comprises a sensor device for sensing the rotation of the rotating member 4 in relation to the casing 1. The sensor device comprises at least one transmitter element 21. In the embodiment disclosed, one such transmitter element 21 is provided. The transmitter element 21 is provided on the rotating member 24 in the inner space 2' and will thus rotate along a circular path when the rotating member 4 rotates. The transmitter element 21 may comprise various kinds of elements emitting any kind of signal. According to an advantageous embodiment, the transmitter element 21 may comprise or consist of a permanent magnet.

The sensor device also comprises a receiver element 22 which is provided on the casing 1 and arranged to sense the transmitter element 21. More specifically, the receiver element 22 is provided on the outside of the casing 1 and may advantageously be attached directly to the outer wall surface 1b. The casing 1, at least in the area where the receiver element 22 is provided, manufactured in a material which is permeable to the signal generated by the transmitter element 21. For instance, the casing may be manufactured in any suitable plastic material. Furthermore, the receiver element 22 is provided in such a position on the casing that it is located relatively close to a point on the circular path in such a way that the receiver element 22 may sense a signal from the transmitter element 21 each time the rotating transmitter element 21 passes through said point, for instance, the magnetic field created by a transmitter element 21 in the form of a permanent magnet. In the embodiment disclosed, the receiver element 22 is provided on an upper end wall 23 of the casing 1 and the transmitter element 21 is provided on the uppermost separating discs 5'. In such a way, the receiver element 22 may be located substantially immediately adjacent to the transmitter element 21 when this element passes through the above mentioned point on the circular path.

Furthermore, the sensor device, comprises a processor unit 24, which is arranged to determined the rotary speed of the rotating member 4 as a function of the passages of the transmitter element 21 through said point and of the time. The processor unit 24 is connected to the receiver element 22 and arranged to count the number of sensed passages of the transmitter element 21 through said point. In such a way, the rotary speed of the rotating member 4 may be determined. The determined rotary speed may be used for controlling the number of revolutions of the drive member 10.

In the embodiment disclosed, the sensor device comprises as mentioned above a transmitter element 21. However, it is to be noted that the sensor device may comprise more then one such transmitter element 21, for instance two, three, four, five or more transmitter elements 21. Preferably, the transmitter elements 21 are uniformly distributed along the periphery of the circular path, i.e. with the same distance between adjacent transmitter elements 21 for providing a balanced rotating member 4. For instance, the sensor device may comprise two diametrically opposite transmitter elements 21. Furthermore, it is possible to let the sensor device comprise merely one transmitter element 21 and one passive weight element 25, wherein the transmitter element 21 and the weight element 25 advantageously are provided on the rotating member 4 at two diametrically opposite positions for providing a balanced rotating member 4.

Furthermore, the transmitter elements 21 may advantageously be embedded in one of the separating discs 5, in the embodiment disclosed, the uppermost separating disc 5'. In such a way, no part of the transmitter element 21 will project above or below the separating disc 5 and in such a way be able to disturb the flowing in the inner space 2'.

It is to be noted that the receiver element 22 also may be attached to the casing 1 at its side wall 26, wherein the transmitter elements 21 may be provided at any of the separating discs 5 which is located in the proximity of the receiver element 22.

The receiver element 22 may be of various kinds and arranged to sense the signal generated by the transmitter element 21. The receiver element 22 may for instance comprise a capacitive sensor, an inductive sensor or a sensor operating with the so-called Hall effect. Such a Hall sensor is advantageous when the transmitter element 21 comprises a permanent magnet.

The invention is not limited to the embodiment disclosed but may be varied and modified within the scope of the following claims.

What is claimed is:

1. A centrifugal separator comprising:
   a stationary casing defining an inner space,
   a spindle,
   a rotating member attached to the spindle and arranged to rotate around an axis (x) of rotation with a rotary speed, wherein the rotating member comprises a number of separating discs which are provided in the inner space,
   a drive member for driving the spindle and the rotating member with said rotary speed,
   a sensor device for sensing the rotation of the rotating member in relation to the casing, wherein the sensor device comprises at least one transmitter element provided in the inner space on the rotating member, and a receiver element provided at the casing and arranged to sense the transmitter element; and wherein
   the receiver element is provided on the casing outside the inner space so that no receiver element part projects into the inner space.

2. A centrifugal separator according to claim 1, wherein the transmitter element is arranged to rotate along a circular path when the rotating member rotates, wherein the receiver element is provided in the proximity of a point on the circular path.

3. A centrifugal separator according to claim 2, wherein the transmitter element comprises a permanent magnet, and the receiver element is arranged to sense a magnetic field from the transmitter element each time the rotating transmitter element passes said point.

4. A centrifugal separator according to claim 2, wherein the sensor device comprises a processor unit, which is arranged to determine the rotary speed of the rotating member as a function of the passages of the transmitter element through said point and of the time.

5. A centrifugal separator according to claim 1, wherein the receiver element is attached to an outer wall surface of the casing.

6. A centrifugal separator according to claim 1, wherein the drive member comprises a blade wheel which is rotatable by means of a fluid jet.

7. A centrifugal separator according to claim 1, wherein the sensor device comprises two transmitter elements which are provided at two diametrically opposite positions on the rotating member.

8. A centrifugal separator according to claim 1, wherein the sensor device comprises the at least one transmitter element and a weight element, which transmitter and weight elements are provided at two diametrically opposite positions on the rotating member.

9. A centrifugal separator according to claim 1, wherein said transmitter element is embedded in one of said separating discs.

10. A centrifugal separator according to claim 1, wherein the receiver element is arranged to operate according to the Hall effect.

11. A centrifugal separator according to claim 1, wherein the centrifugal separator is adapted for cleaning a gas by separation of liquid contaminants from the gas, wherein the centrifugal separator comprises an inlet for the gas to be cleaned, a gas outlet for the cleaned gas and an outlet for the separated liquid contaminants.

12. A centrifugal separator according to claim 11, wherein the inner space has an upper end and a lower end, and that the receiver element is provided in the proximity of the upper end, wherein the outlet for the liquid contaminants is provided at the lower end, or that the receiver element is provided in the proximity of the lower end, wherein the outlet for the liquid contaminants is provided at the upper end.

13. A method of using a centrifugal separator according to claim 1, the method comprising the step of cleaning crankcase gases from a combustion engine.

* * * * *